United States Patent
Sallberg

(10) Patent No.: US 6,519,252 B2
(45) Date of Patent: *Feb. 11, 2003

(54) SYSTEM AND METHOD FOR CONNECTING A CALL TO A MOBILE SUBSCRIBER CONNECTED TO THE INTERNET

(75) Inventor: Krister Sallberg, Lund (SE)

(73) Assignee: Ericsson Inc., Research Triangle Park, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,274

(22) Filed: Dec. 31, 1997

(65) Prior Publication Data

US 2001/0043588 A1 Nov. 22, 2001

(51) Int. Cl.[7] .......................... H04L 12/66; H04L 12/28; H04Q 7/00; H04M 3/42
(52) U.S. Cl. ..................... 370/356; 370/401; 370/328; 379/211.02
(58) Field of Search ................................. 370/352, 355, 370/356, 493, 522, 346, 349, 354, 358, 328; 379/215, 93.35, 88.12, 88.13, 88.16, 88.17, 88.19, 210–212, 93.15, 308, 90.01, 93.01, 93.09, 211.02

(56) References Cited

U.S. PATENT DOCUMENTS

| | | | | |
|---|---|---|---|---|
| 5,570,367 A | * | 10/1996 | Ayanoglu et al. | 370/346 |
| 5,590,133 A | * | 12/1996 | Billstrom et al. | 370/349 |
| 5,600,704 A | * | 2/1997 | Ahlberg et al. | 370/201 |
| 5,805,587 A | * | 9/1998 | Norris et al. | 370/352 |
| 5,809,128 A | * | 9/1998 | McMullin | 370/352 |
| 5,839,065 A | * | 11/1998 | Joensuu et al. | 379/211 |
| 5,867,784 A | * | 2/1999 | Lantto | 379/211 |
| 5,889,774 A | * | 3/1999 | Mirashrafi et al. | 370/352 |
| 5,943,399 A | * | 8/1999 | Bannister et al. | 379/88.17 |
| 5,946,381 A | * | 8/1999 | Danne et al. | 370/352 |
| 5,953,322 A | * | 9/1999 | Kimball | 370/356 |
| 5,982,774 A | * | 11/1999 | Foladare et al. | 370/352 |
| 6,088,594 A | * | 7/2000 | Kingdon et al. | 455/457 |
| 6,118,778 A | * | 9/2000 | Amin | 370/352 |
| 6,125,126 A | * | 9/2000 | Hallenstal | 370/352 |
| 6,219,413 B1 | * | 4/2001 | Burg | 379/215 |

FOREIGN PATENT DOCUMENTS

| | | |
|---|---|---|
| EP | 0 766 490 A2 | 4/1997 |
| WO | WO 97/26749 | 7/1997 |

OTHER PUBLICATIONS

R. Babbage, I. Moffat, A. O'Neill and S. Sivaraj; "Internet phone—changing the telephony paradigm?"; BT Technology Journal, vol. 15, No. 2, Apr. 1997; pp. 145–157.

PCT International Search Report dated Apr. 12, 1999.

* cited by examiner

Primary Examiner—Kwang Bin Yao
Assistant Examiner—Hanh Nguyen
(74) Attorney, Agent, or Firm—Jenkens & Gilchrist, P.C.

(57) ABSTRACT

A telecommunications system and method is disclosed for providing interoperability between a cellular system's direct access to the Internet and the telephony service provided by the Public Switched Telephone Network (PSTN), in order to allow a mobile subscriber to receive calls from the PSTN while engaged in data communication, for example, over the Internet. When a Mobile Station (MS) has an active connection to a server or router running Internet Protocol, an incoming PSTN call can be forwarded to a voice gateway within the serving Mobile Switching Center/Visitor Location Register (MSC/VLR), which transforms the call to an Internet phone call. During the direct access connection to the Internet, the MS can signal specific information, using, e.g., a prefix, to activate the call forwarding to voice gateway feature.

29 Claims, 4 Drawing Sheets

SYSTEM AND METHOD FOR CONNECTING A CALL TO A MOBILE SUBSCRIBER CONNECTED TO THE INTERNET

BACKGROUND OF THE PRESENT INVENTION

1. Field of the Invention

The present invention relates generally to telecommunications systems and methods for providing voice communication over the Internet, and specifically to allowing mobile subscribers to receive calls from the Public Switched Telephone Network (PSTN) during an Internet session.

2. Background and Objects of the Present Invention

Cellular telecommunications is one of the fastest growing and most demanding telecommunications applications ever. Today it represents a large and continuously increasing percentage of all new telephone subscriptions around the world. Cellular networks have evolved into two different networks. The European cellular network uses the Global System for Mobile Communication (GSM) digital mobile cellular radio system. In the United States, cellular networks are still primarily analog, but many North American cellular networks have begun deploying SS7 to support access of remote databases. European cellular networks have always relied on SS7 for their signaling requirements. However, GSM is currently operated in North America in a newly reserved frequency band in the 1900 MHZ range. The revised GSM standard is also known as Personal Communication Services 1900 or PCS 1900. FIG. 1 illustrates the typical components of a GSM/PCS 1900 wireless communications system 10.

The GSM/PCS 1900 wireless communications system 8 is located within a geographical area serviced by a single provider, hereinafter referred to as the Public Land Mobile Network (PLMN) 10. The basic components of the wireless communications system 10 are a Base Station System (BSS) 25, a Mobile Switching Center (MSC) 14 and a Mobile Station (MS) 20. At least one BSS 25 is deployed within the PLMN 10. The BSS 25 acts as an interface between the MSC 14 and a plurality of MSs 20. The MS 20 may be a mobile wireless telephone, a pager or other equipment. The MS 20 may not access the GSM/PCS 1900 wireless communications system 10 without providing subscriber specific data for the MS 20. This data is provided through use of a Subscriber Identity Module (SIM) card 13 which is plugged into the MS 20, or other memory. The SIM card 13 allows the subscriber to access the network through any MS 20 in which the subscriber has inserted their SIM card 13. The SIM card 13 includes such data as a subscriber authentication key, the International Mobile Subscriber Identity (IMSI) number, temporary network data, service related data (e.g. language preference), charging information and other data.

The BSS 25 includes a Base Transceiver Station (BTS) 24 and a Base Station Controller (BSC) 23. The BTS 24 operates as a transceiver for transmitting and receiving data and control messages to and from the MS 20 over the air interface. The BSS 25 is connected to the MSC 14 through dedicated telephone lines through an A-interface 15. Also connected to the MSC 14 is a Visitor Location Register (VLR) 16 and a Home Location Register (HLR) 26. The HLR 26 is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 2. The MSC/VLR areas 12 include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12, in turn, is divided into a number of cells 22, each of which has at least one BTS 24.

The VLR 16 is a database containing information about all of the MSs 20 currently located within the MSC/VLR area 12. If a MS 20 roams into a new MSC/VLR area 12, the VLR 16 connected to that MSC 14 will request data about that Mobile Station (terminal) 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

An interworking function (IWF) 17 within the MSC 14 links the wireless communications system 10 to the Public Switched Telephone Network (PSTN) 19. The MSC 14 and IWF 17 control the switching of incoming calls to various BSSs 25 and the interfacing of outgoing calls to the PSTN 19.

With reference now to FIG. 2 of the drawings, a separate network that provides packet data communications is known as the "Internet". The Internet is based on the Transmission Control Protocol/Internet Protocol (TCP/IP protocol), which was developed as a standard protocol to allow different types of computers to exchange electronic mail and other files over a network. The TCP/IP Protocol specifies the addressing of nodes on the Internet and provides a method of sending packets of data from one node to another. The TCP or Transmission Control Protocol is an application implemented on top of the IP to provide reliable delivery of the data packets end-to-end.

Typically, an Internet session begins by an Internet user 200, e.g., a computer, dialing the access number for a specific Internet Service Provider (ISP) 260. This call is then routed from the Internet user's end office 210, e.g., a Service Switching Point (SSP) for a wireline Internet user, or a Mobile Switching Center (MSC) for a wireless Internet user, to an end office (local access point) 220 where the ISP 260 resides. Finally, a Point-to-Point (PPP) protocol or Serial Line Internet Protocol (SLIP) connection is established between the computer's 200 modem and the ISP 260. During a session, digital data is exchanged over the subscriber's line using the standard TCP/IP protocol in the form of packets.

All that is required for use of the Internet 260 for telephony purposes is a sound card mounted in a personal computer (PC), a microphone, a pair of speakers connected to the sound card, and a telephony application (software) that recognizes the sound card. Bidirectional voice communication between two telephony applications is then possible, e.g., a subscriber can make and receive calls to or from another PC or the public PSTN.

Currently, the industry is developing systems and methods for allowing a subscriber to make and receive calls on the wireline subscriber line to which a modem is connected during an Internet session. This simultaneous telephony and Internet access over a single Plain Old Telephone Service (POTS) access line, which is not a digital line, is achieved by transforming an incoming POTS call into an Internet phone call when the access line is busy, using modem communications between the subscriber's host computer 200 and an ISP 260. With this technology, it will soon also be possible to place telephone calls by an on-line subscriber through the Internet phone application towards a normal POTS subscriber. This can be accomplished by the Internet phone service being terminated in a voice gateway node to the POTS network, which then routes and carries the phone call.

For wireless applications, the MS is typically connected to the Internet either by use of a Direct Access (DA) service or by a call connection to an Internet Service Provider (ISP), as described in FIG. 2 of the drawings. However, existing technology does not allow a mobile/cellular system to act as the access network for the called or calling party. Therefore, a mobile subscriber cannot receive incoming calls over the mobile station when it is connected to a modem on a computer during an Internet session.

It is therefore an object of the invention to enable a mobile subscriber, engaged in an ongoing Internet session over an IP (Internet Protocol) link, to receive an incoming call over the cellular network without disrupting the Internet session.

SUMMARY OF THE INVENTION

The present invention is directed to telecommunications systems and methods for providing interoperability between a mobile/cellular system's direct access to the Internet or other IP/packet data based networks and the telephony service provided by the POTS and ISDN networks, in order to allow a mobile subscriber to receive calls from the PSTN while engaged in data communication, for example, over the Internet. When the MS has an active connection to a server or router running IP, e.g., the Direct Access Unit (DAU) or to an Internet Service Provider, e.g., America On-Line, through Point-to-Point (PPP) or Serial Line Internet Protocol (SLIP) over a link layer protocol, such as HDLC or other modem protocol, an incoming PSTN call can be forwarded to a voice gateway within the serving MSC/VLR. The voice gateway then transforms the call to an Internet phone call on the IP protocol. From the called party's (mobile subscriber's) view, incoming calls will have the appearance of an Internet phone call coming from the Internet. During the direct access connection to the Internet the MS can signal specific information, using, e.g., a prefix, to activate the call forwarding to voice gateway feature.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
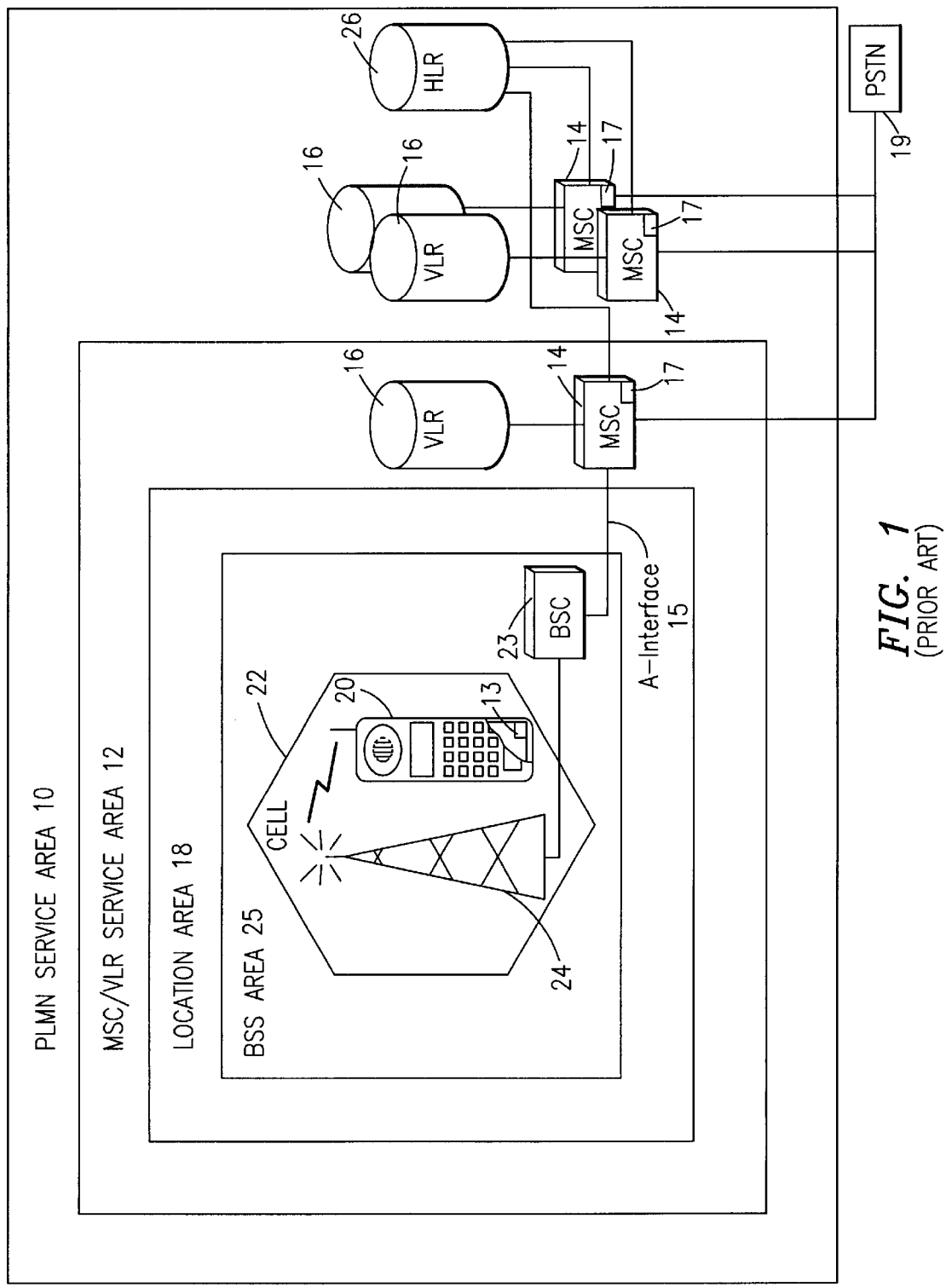
FIG. 1 is a block diagram of a conventional terrestrially-based wireless telecommunications network.
Figure 2:
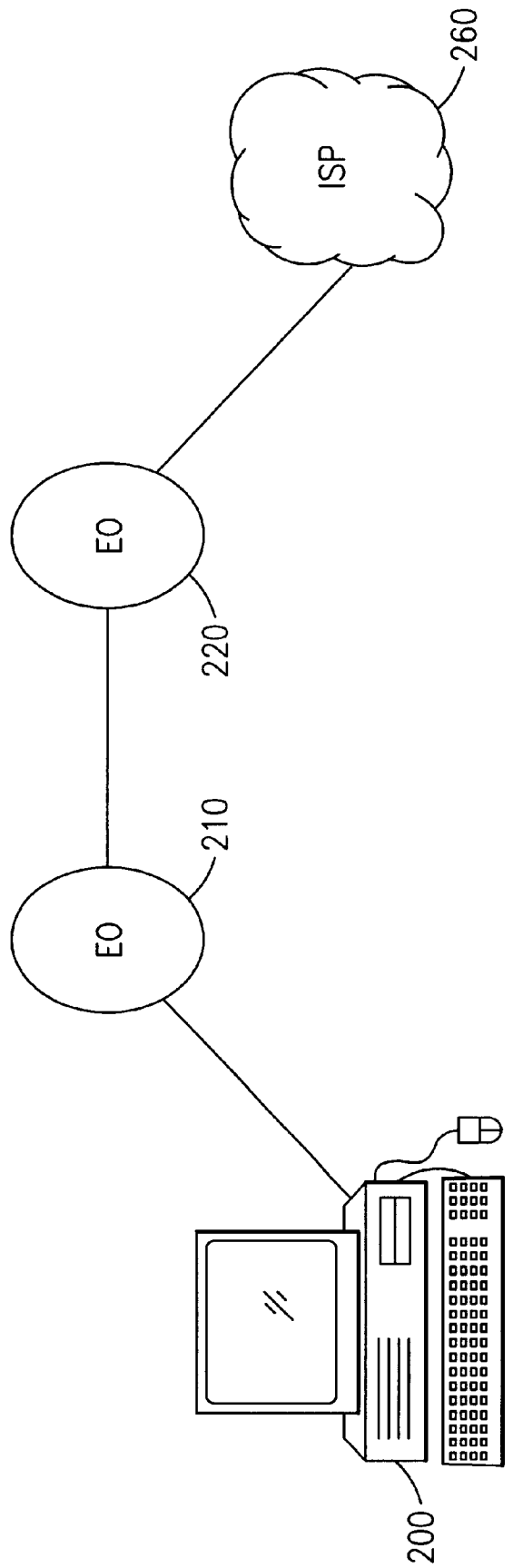
FIG. 2 demonstrates a conventional call connection between an Internet Service Provider and an Internet user.
Figure 3A:
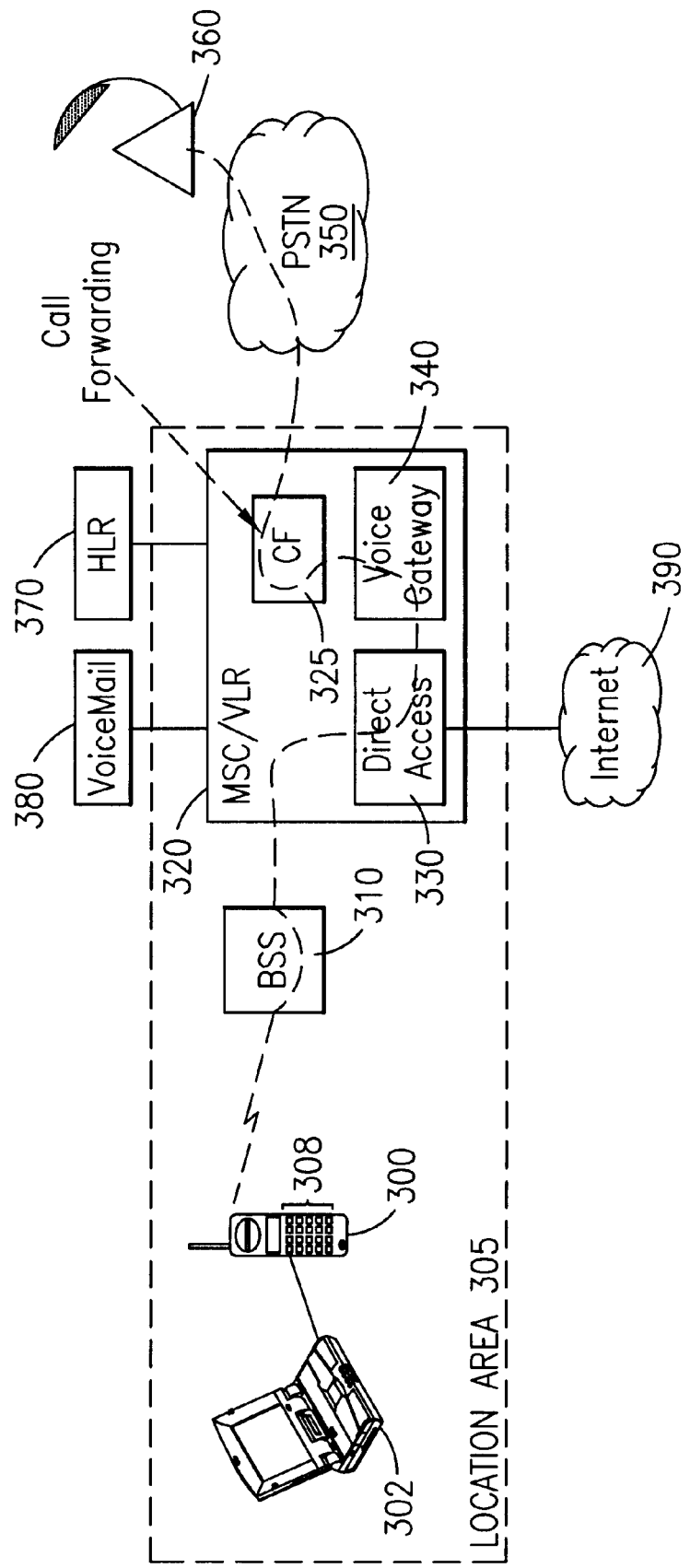
FIGS. 3A and 3B are block diagrams illustrating a call connection between a mobile terminal connected to the Internet and the Public Switched Telephone Network (PSTN).
Figure 3B:
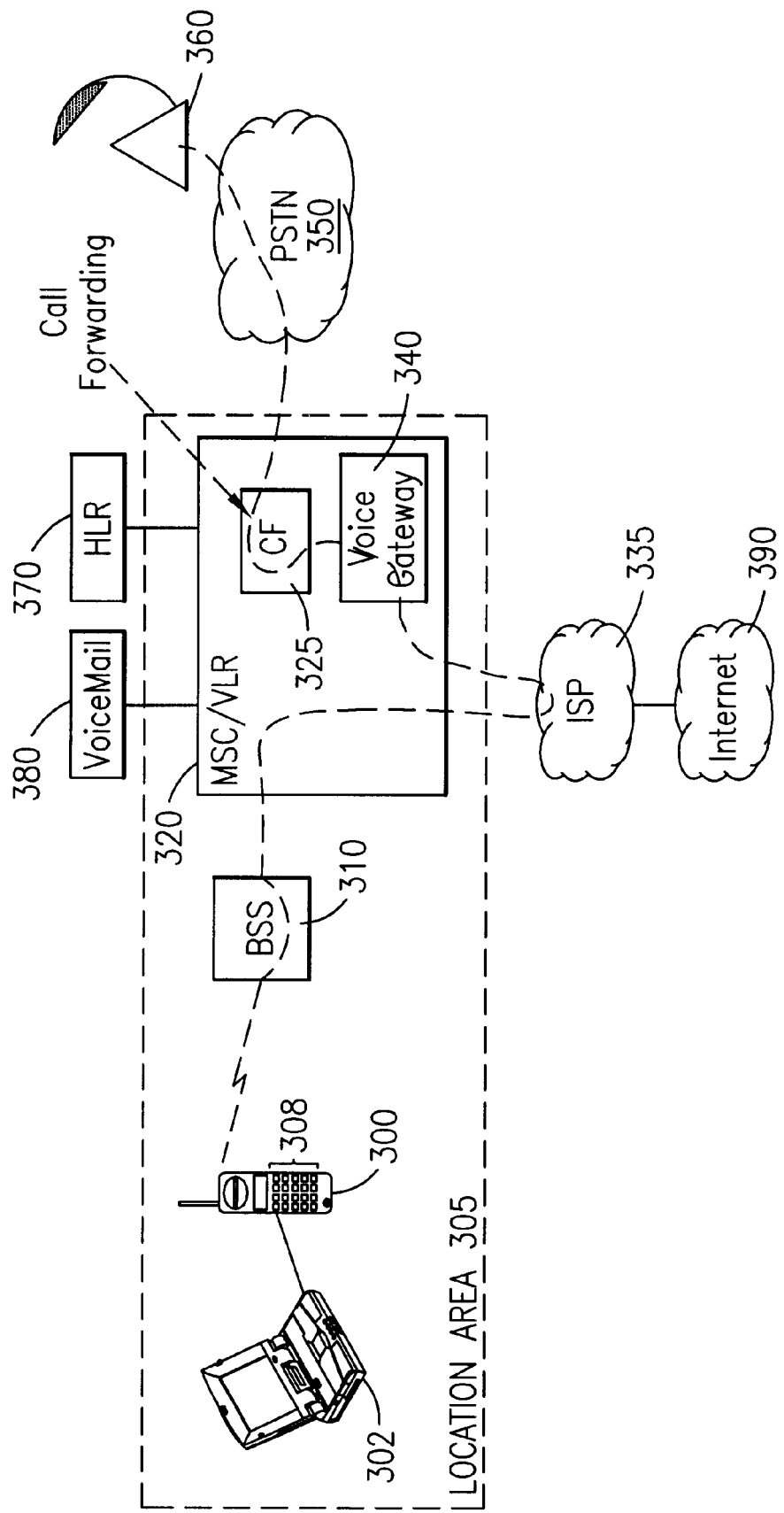

In a Global System for Mobile Communications (GSM)/ Personal Communications System (PCS) system, incoming voice calls to a Mobile Station (MS) 300 are typically routed to a Mobile Switching Center/Visitor Location Register (MSC/VLR) 320 serving a location area (LA) 305 where the MS 300 is located. However, with reference now to FIG. 3A of the drawings, in accordance with a first preferred embodiment of the present invention, when the MS 300 has an active call connection to a server or router running Internet Protocol (IP), e.g., a Direct Access Unit (DAU) 330 within the MSC/VLR 320 or to an Internet Service Provider (ISP) 335 (as illustrated in FIG. 3B of the drawings) through Point-to-Point (PPP) or Serial Line Internet Protocol (SLIP) over a link layer protocol, such as HDLC or other modem protocol, in order for the MS 300 to receive incoming Public Switched Telephone Network (PSTN) 350 calls, the subscriber must have a subscription to a call forwarding to voice gateway feature 325. This enables the incoming PSTN 350 call to be forwarded to a voice gateway 340 within the serving MSC/VLR 320. The voice gateway 340 then transforms the call to an Internet phone call using Internet Protocol. Thus, from the called party's 300 (mobile subscriber's view), the incoming call through the MS 300 to, for example, a laptop computer 302, will have the appearance of an Internet phone call coming from the Internet 390.

When the MS 300 enters the LA 305 associated with the serving MSC/VLR 320, the MS 300 performs a location update to the serving MSC/VLR 320. The serving MSC/VLR 320 then informs a Home Location Register (HLR) 370 associated with the MS 300 of the new location of the MS 300 and obtains subscriber data, including parameters of the call forwarding to voice gateway feature 325, associated with the MS 300 from the HLR 370. Thereafter, when the MS 300 requests a call connection to the DAU 330 or to an ISP 335, e.g., by sending a SETUP message to the serving MSC/VLR 320, the serving MSC/VLR 320 checks the subscriber data associated with the MS 300 to determine if the subscriber has purchased the call forwarding to voice gateway feature 325. If the subscriber has purchased the call forwarding to voice gateway feature 325, the voice gateway feature 325 is activated.

Thereafter, when a PSTN 350 call enters the serving MSC/VLR 320, the PSTN 350 call is forwarded to the voice gateway 340, where the call is transformed into an Internet call. The IP packets related to the Internet call are then routed to the MS 300 via the DAU 330 within the MSC/VLR 320 and a Base Station System (BSS) 310 connected to the MSC/VLR 320. Alternatively, as shown in FIG. 3B of the drawings, if the MS 300 has a call connection to an ISP 335, the PSTN 350 call is routed to the MS 300 from the voice gateway 340 via the ISP 335 and the BSS 310.

However, if the subscriber has not purchased the call forwarding to voice gateway feature 325 or the subscriber rejects the call, e.g., does not answer the call, the call can be redirected to the subscriber's voice mail system 380 or the calling party can receive a busy signal.

In a second embodiment, during the MS 300 originated connection establishment of a direct access to the Internet 390, the MS 300 can signal specific information, such as a prefix, to activate the call forwarding to voice gateway feature 325. For example, the subscriber could enter a service code, e.g., *99, on a keypad 308 of the MS 300, which is sent to the serving MSC/VLR 320 in the originating SETUP message or as a service code in an Unstructured Supplementary Service Data (USSD) message. Once the MSC/VLR 320 receives the service code, the MSC/VLR 320 can then optionally check the subscriber data associated with the MS 300 to determine if the subscriber has purchased the call forwarding to voice gateway feature 325. If so, the MSC/VLR 320 activates the call forwarding to voice gateway feature 325. Thereafter, when a PSTN 350 call to the MS 300 enters the serving MSC/VLR 320, the call can then be forwarded to the voice gateway 340 and completed to the MS 300 via the DAU 330 and the BSS 310 or the ISP 335 and the BSS 310, as described hereinabove.

However, if the MS 300 has not purchased the call forwarding to voice gateway feature 325, or if the subscriber has deactivated the feature 325, e.g., by entering another service code, the call can be forwarded to the subscriber's voice mail system 380 or the calling party can receive a busy signal.

In addition, for either of the above listed embodiments, if the PSTN 350 call can be completed to the MS 300, there will be some requirements on the bandwidth across the air interface. For example, two time slots, provided by High Speed Circuit Switched Data (HSCSD), will typically be required because most Internet phone applications require at least a 14.4 modem. However, one time slot may be enough with 14.4 channel coding, and future voice codecs may even provide a reasonable voice quality on 9.6 kbps. The bandwidth requirements need to be checked by the MSC/VLR 320, and if the requirements age can not be met, the call can be forwarded to the subscriber's voice mail 380 or the calling party can receive a busy signal.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for connecting an incoming voice call to a mobile terminal in wireless communication with a mobile switching center within a cellular network, said telecommunications system comprising:

a data network connected to said cellular network via said mobile switching center, said mobile terminal being involved in a data call connection with said data network via said mobile switching center;

a voice gateway within said mobile switching center, said voice call received at said mobile switching center during said data call connection being forwarded to said voice gateway when said mobile terminal has activated a call forward feature associated therewith, said voice gateway transforming said voice call into an Internet call; and an Internet router connected to said mobile switching center and said data network for said data call connection, said Internet call being connected from said voice gateway to said mobile terminal via said Internet router.

2. The telecommunications system of claim 1, wherein said Internet call is connected between said mobile terminal and a calling subscriber within the Public Switched Telephone Network.

3. The telecommunications system of claim 2, wherein said calling subscriber receives a busy signal when said mobile terminal does not have said call forward feature associated therewith.

4. The telecommunications system of claim 1, wherein said voice call is forwarded to said voice gateway when said mobile terminal sends a service code to said mobile switching center, said service code activating said call forward feature.

5. The telecommunications system of claim 1, wherein parameters associated with said call forward feature are obtained by a visitor location register connected to said mobile switching center from a home location register connected to said visitor location register when said mobile terminal enters a location area served by said mobile switching center, said call forward feature being activated when said mobile terminal initiates said data call connection.

6. The telecommunications system of claim 1, wherein said Internet router is a direct access unit within said mobile switching center.

7. The telecommunications system of claim 6, wherein said Internet call is connected to said mobile terminal from said voice gateway via said direct access unit and a base station system connected to said mobile switching center.

8. The telecommunications system of claim 1, wherein said Internet router is an Internet Service Provider connected to said mobile switching center.

9. The telecommunications system of claim 8, wherein said Internet call is connected to said mobile terminal from said voice gateway via said Internet Service Provider and a base station system connected to said mobile switching center.

10. The telecommunications system of claim 1, wherein said voice call is connected, by said mobile switching center, to a voice mail system associated with said mobile terminal when said mobile terminal does not have said call forward feature associated therewith.

11. The telecommunications system of claim 1, wherein said voice call is connected, by said mobile switching center, to a voice mail system associated with said mobile terminal when bandwidth requirements associated with said Internet call cannot be met by said mobile switching center.

12. The telecommunications system of claim 1, wherein said voice call is connected, by said mobile switching center, to a voice mail system associated with said mobile terminal when said mobile terminal rejects said Internet call.

13. A method for connecting an incoming voice call to a mobile terminal in wireless communication with a mobile switching center within a cellular network, said method comprising the steps of:

initiating a data call connection between said mobile terminal and a data network, said data network being connected to said cellular network via an Internet router connected to said mobile switching center;

activating, by said mobile switching center, a call forward feature associated with said mobile terminal in response to said step of initiating;

receiving, by said mobile switching center, said voice call during said data call connection;

forwarding, by said mobile switching center, said voice call to a voice gateway within said mobile switching center;

transforming, by said voice gateway, said voice call into an Internet call; and connecting said Internet call from said voice gateway to said mobile terminal via said Internet router.

14. The method of claim 13, wherein said Internet call is connected between said mobile terminal and a calling subscriber within the Public Switched Telephone Network.

15. The method of claim 14, further comprising, before said step of forwarding, the step of:

receiving, by said calling subscriber, a busy signal when said mobile terminal does not have said call forward feature associated therewith.

16. The method of claim 13, wherein said step of activating is performed when said mobile terminal sends a service code to said mobile switching center, said service code activating said call forward feature.

17. The method of claim 13, further comprising, before said step of activating, the step of:

obtaining, by a visitor location register connected to said mobile switching center, parameters associated with said call forward feature from a home location register connected to said visitor location register when said mobile terminal enters a location area served by said mobile switching center.

18. The method of claim 13, wherein said Internet router is a direct access unit within said mobile switching center.

19. The method of claim 18, wherein said step of connecting said Internet call to said mobile terminal is performed from said voice gateway via said direct access unit and a base station system connected to said mobile switching center.

20. The method of claim 13, wherein said Internet router is an Internet Service Provider connected to said mobile switching center.

21. The method of claim 20, wherein said step of connecting said Internet call to said mobile terminal is performed from said voice gateway via said Internet Service Provider and a base station system connected to said mobile switching center.

22. The method of claim 13, further comprising, before said step of activating, the step of:

connecting, by said mobile switching center, said voice call to a voice mail system associated with said mobile terminal when said mobile terminal does not have said call forward feature associated therewith.

23. The method of claim 13, further comprising, before said step of forwarding, the step of:

connecting, by said mobile switching center, said voice call to a voice mail system associated with said mobile terminal when bandwidth requirements associated with said Internet call cannot be met by said mobile switching center.

24. The method of claim 13, further comprising, after said step of transforming, the step of:

connecting, by said mobile switching center, said voice call to a voice mail system associated with said mobile terminal when said mobile terminal rejects said Internet call.

25. A telecommunications system for connecting an incoming voice call to a mobile terminal in wireless communication with a mobile switching center within a cellular network, said mobile terminal being alternately connected to said cellular network or a data network connected to said cellular network via said mobile switching center, said telecommunications system comprising:

means for activating a call forward feature associated with said mobile terminal;

a voice gateway within said mobile switching center, said voice call being received at said mobile switching center during a data call connection between said mobile terminal and said data network via said mobile switching center, said received voice call being forwarded to said voice gateway when said call forward feature is activated, said voice gateway transforming said voice call into an Internet call; and an Internet router connected to said mobile switching center and said data network for said data call connection, said Internet call being connected from said voice gateway to said mobile terminal via said Internet router.

26. The telecommunications system of claim 25, wherein said means for activating said call forward feature comprises said mobile terminal sending a service code to said mobile switching center to activate said call forward feature.

27. The telecommunications system of claim 26, wherein said means for activating said call forward feature comprises sending said service code to said mobile switching center prior to said mobile switching center receiving said incoming voice call.

28. The telecommunications system of claim 25, wherein said means for activating said call forward feature comprises said mobile switching center obtaining subscriber data including said call forward feature from a home location register associated with said mobile terminal.

29. The telecommunications system of claim 28, wherein said subscriber data is retrieved by said mobile switching in response to a location update by said mobile terminal.

* * * * *

UNITED STATES PATENT AND TRADEMARK OFFICE
CERTIFICATE OF CORRECTION

PATENT NO. : 6,519,252 B2
DATED : February 11, 2002
INVENTOR(S) : Krister Sallberg It is certified that error appears in the above-identified patent and that said Letters Patent is hereby corrected as shown below:

Column 5,
Line 33, replace "requirements age can not be" with -- requirements can not be --

Signed and Sealed this

Twelfth Day of August, 2003

JAMES E. ROGAN
*Director of the United States Patent and Trademark Office*